United States Patent
Farrokhabadi et al.

(10) Patent No.: US 12,311,779 B2
(45) Date of Patent: May 27, 2025

(54) METHODS AND SYSTEMS FOR ELECTRIC VEHICLE TELEMATICS ESTIMATION

(71) Applicant: BluWave Inc., Ottawa (CA)

(72) Inventors: Mostafa Farrokhabadi, Ottawa (CA); Nasrin Sadeghianpourhamami, Ottawa (CA); Rahul Gahlawat, Ottawa (CA); Devashish Paul, Ottawa (CA)

(73) Assignee: BluWave Inc.

( * ) Notice: Subject to any disclaimer, the term of this patent is extended or adjusted under 35 U.S.C. 154(b) by 356 days.

(21) Appl. No.: 17/870,025

(22) Filed: Jul. 21, 2022

(65) Prior Publication Data
US 2024/0025270 A1  Jan. 25, 2024

(51) Int. Cl.
*B60L 15/20* (2006.01)
*B60L 58/12* (2019.01)
*G06N 5/022* (2023.01)

(52) U.S. Cl.
CPC ........... *B60L 15/2045* (2013.01); *B60L 58/12* (2019.02); *G06N 5/022* (2013.01); *B60L 2240/12* (2013.01); *B60L 2240/66* (2013.01); *B60L 2240/68* (2013.01); *B60L 2250/26* (2013.01)

(58) Field of Classification Search
CPC .. B60L 15/2045; B60L 58/12; B60L 2240/12; B60L 2240/66; B60L 2240/68; B60L 2250/26; G06N 5/022
See application file for complete search history.

(56) References Cited

U.S. PATENT DOCUMENTS

| | | | | |
|---|---|---|---|---|
| 2022/0410750 A1* | 12/2022 | Mangal | ............. | B60L 53/62 |
| 2023/0038012 A1* | 2/2023 | Erozlu | ............. | B60L 58/13 |
| 2023/0173862 A1* | 6/2023 | Noland | ............. | B60K 6/52 |
| | | | | 701/37 |
| 2023/0347776 A1* | 11/2023 | McLachlan | ............. | G06F 3/048 |
| 2024/0025270 A1* | 1/2024 | Farrokhabadi | ............. | G06N 3/09 |

OTHER PUBLICATIONS

Dedek et al., "BEV Remaining Range Estimation Based on Modern Control Theory—Initial Study," 16th Int. IFAC Conf. Programmable Devices and Embedded Systems (PDeS) High Tatras, 2019, vol. 52 (27), pp. 86-91.

* cited by examiner

*Primary Examiner* — Hussein Elchanti
(74) *Attorney, Agent, or Firm* — Borden Ladner Gervais LLP (57) ABSTRACT

Improvements in the field of electric vehicles (EV) are provided, including EV telematics estimation. Prior techniques estimate a state of charge (SoC) of a battery of an EV based on electrochemical measurements of the battery, such as battery terminal voltage, battery current, or cell temperature. The present improvements estimate SoC or other parameters based on non-electrochemical variables, referred to as exogenous information, meaning information other than electrochemical parameters of the battery. Example exogenous information includes battery type, and battery capacity, vehicle type or load, driver behaviour, weather conditions, or traffic or road conditions. Exogenous information may be used to enable more accurate estimations of EV SoC by EV related systems.

20 Claims, 5 Drawing Sheets

METHODS AND SYSTEMS FOR ELECTRIC VEHICLE TELEMATICS ESTIMATION

CROSS REFERENCE TO RELATED APPLICATIONS

None.

FIELD

The present disclosure generally relates to improvements in technologies that estimate data relating to assets such as electric vehicles (EVs), and to improvements in control systems that use such estimated data.

BACKGROUND

With the proliferation of fleets of EVs, optimal energy management of fleet EVs is generally desirable to increase economic and/or environmental benefits. An indispensable element of the optimization process is often access to telematics data of the EV in real-time and as the vehicle operates. For example, accessing a state of charge (SoC) of a battery of an EV during the operation is typically crucial to the efficacy of a fleet energy management system.

There are some existing techniques for attempting to calculate a battery SoC using information obtained from the battery, such as the terminal voltage, current, cell's temperature, electrochemical state, etc. The existing body of work pertain to "calculation" of a battery SoC based on the electrochemical relations between energy, voltages, currents, etc. Such a model is an indispensable element of the battery manufacturing process, without which it is not practical to use the battery.

Perhaps the majority of EVs, some or all of the vehicles' telematics data is proprietary information of the manufacturer. Accordingly, the fleet operator may not be able to readily or freely access some or all of the telematics data from the vehicle during the vehicle's operation. For instance, for some EVs, it is possible to pay a fee to obtain access to the telematic data of the EV. The telematics data of an EV may include the SoC of the vehicle during operation. This can create a major barrier to optimal energy management of the fleet.

The above information is presented as background information only to assist with an understanding of the present disclosure. No assertion or admission is made as to whether any of the above, or anything else in the present disclosure, unless explicitly stated, might be applicable as prior art with regard to the present disclosure.

BRIEF DESCRIPTION OF THE DRAWINGS

Example embodiments of the present disclosure will now be described with reference to the attached Figures.

The relative sizes and relative positions of elements in the drawings are not necessarily drawn to scale. For example, the shapes of various elements and angles are not necessarily drawn to scale, and some of these elements may be arbitrarily enlarged and/or positioned to improve the readability of the drawings. Further, the particular shapes of the elements as drawn are not necessarily intended to convey any information regarding the actual shape of the particular elements, and have been solely selected for ease of recognition in the drawings.

DETAILED DESCRIPTION

The foregoing summary provides some example aspects and features according to the present disclosure. It is not intended to be limiting in any way. For example, the summary is not necessarily meant to identify important or crucial features of the disclosure. Rather, it is merely meant to introduce some concepts according to the disclosure. Other aspects and features of the present disclosure are apparent to those ordinarily skilled in the art upon review of the following description of specific example embodiments in conjunction with the accompanying figures.

In an aspect, the present disclosure is generally directed to improvements in computer-based technologies relating to estimating data, values, or other information associated with assets using machine learning based systems. In an embodiment, the assets comprise vehicles, which may comprise EVs. In an embodiment, at least some of the estimated data relates to vehicle telematics information relating to the vehicles. In an aspect, the present disclosure is directed to improvements in computer-based technologies comprising a system for controlling or managing a set of assets based on the estimated data.

Generally, telematics data may include any information or data relating to a vehicle, including but not limited to SoC of a battery of an EV, energy level of the battery, vehicle location, route, number of stops, tire pressure, idling time, speed, rate of acceleration (for example gentle, medium, or high), rate of braking, fuel consumption, vehicle faults, vehicle diagnostics, and so on. As previously discussed, at least some of this telematics data may not be available to a third party, for instance when the vehicle is in an operational state. This can impose a major challenge in managing an EV fleet. Thus, according to the present disclosure, at least some of this unavailable data may be estimated.

An EV being in an operational state can mean that the EV is being used, is being driven, is turned on, and/or is away from a fleet depot location or another location. In some instances, when an EV is an operational state, at least some telematics data associated with an EV is not accessible to a third party such as a fleet operator, for example because this data may be proprietary information of the EV manufacturer. Hereinafter, reference will be made to a fleet operator, although this could be any third party or entity. Thus, when an EV is an operational state, the at least some telematics data that is not accessible to the fleet operator generally cannot be used to estimate the SoC of the EV. However, some telematics data associated with the EV may be available to the fleet operator when the EV is an operational state, for example EV location or EV speed. Furthermore, some telematics data may be available within the vehicle when the EV is an operational state, for example SoC related information may be displayed on a vehicle dashboard to the driver. In an embodiment, telematics data not being available to a fleet operator generally means the data is either not available or not freely available to the fleet operator. However, when the EV is not in an operational state, for example when the EV is connected to a charging station and/or is located at a fleet depot location or another location, the telematics data may be accessible to a fleet operator.

In at least some embodiments, the vehicle telematics data that may be estimated by a system according to the present disclosure may include SoC information of a battery of one or more EVs. In some embodiments, the estimated data may comprise data other than SoC information, for example any data relating energy of the EV such as but not limited to rate of energy consumption (e.g. per unit of distance such as km). In other embodiments, data may be estimated for assets other than EVs.

A SoC of a battery, or of a battery cell, generally refers to a energy level that is currently available from the battery as a function or percentage of the maximum capacity of the battery. Thus, the SoC value typically varies between 0% and 100%. A battery is said to be fully charged when the SoC is at 100%, and a battery is said to be completely discharged when the SoC is 0%. An absolute (meaning not a ratio) amount of remaining energy in a battery may be calculated by multiplying the SoC value against the maximum capacity of the battery.

In the present disclosure, examples are described wherein a SoC of a battery of an EV is estimated. However, estimating SoC information associated with an EV is not limited to only estimating SoC data, for example as expressed as a percentage or ratio of a maximum capacity of the battery. Rather, according to the present disclosure, the expressions estimating SoC and estimating SoC information more generally include estimating any parameter or value representing to, or indicating, an energy level of a battery. For example, SoC information may comprise or consist of the energy level of a battery, which may be represented in a unit of energy (e.g. kWh).

As previously noted above, there are previous techniques for attempting to calculate a battery SoC using information obtained from the battery, such as the terminal voltage, current, cell's temperature, electrochemical state, etc. However, in at least some aspects, these techniques are fundamentally different than techniques according to the present disclosure. The existing body of work, namely the previous techniques, pertains to a "calculation" of a battery SoC based on the electrochemical relations between energy, voltages, currents, etc. Such a model is an indispensable element of the battery manufacturing process, without which it is not practical to use the battery efficiently. In contrast, at least some techniques according to the present disclosure pertain to estimating an electric vehicle battery SoC or other parameters based on non-electrochemical variables. A historical SoC calculated by the manufacturer may be one of the inputs used in some of the embodiments according to the present disclosure. Here, an objective may be to estimate a SoC when the "calculated" SoC is not freely and/or remotely accessible. Thus, the present techniques for estimating a SoC based on non-electrochemical parameters are fundamentally different than and not interchangeable with electrochemical-based SoC calculation models.

The SoC of an EV may be estimated using a model based on the EV's battery capacity, energy consumption efficiency (in terms of energy usage per unit distance, e.g. km) and distance travelled since the last known or estimated value of the SoC. For example, for an EV with effective battery capacity of 80 kWh and energy consumption efficiency of 12 kWh/100 km, if the EV's last measured or calculated SoC was 80% and it has traveled 100 km, the SoC could be estimated to be 65%. However, such simple techniques often only provide rough estimates of SoC and therefore are not very accurate.

According to an aspect, the present disclosure relates to a system and method for estimating the SoC of an EV based on information that is exogenous to the battery. Exogenous information generally refers to information that is not indicative of a current physical state of the battery. For example, information that is indicative of a current physical state of the battery may include the battery terminal voltage, battery current, cell temperature, and/or electrochemical state, and so on. However, in contrast, exogenous information may include specifications of the battery, such as one or more of battery type, and battery capacity, energy consumption efficiency, and so on, which are generally not indicative of a current physical state of the battery. Furthermore, exogenous information may include battery effective capacity or energy consumption efficiency, which typically deteriorates with age and usage of the battery. This information is typically indicated in the battery specifications. Furthermore, exogenous information may include, for example, information relating to the vehicle, such as vehicle type, vehicle weight, vehicle load (including weight of passenger(s) or occupant(s) or cargo), and so on, or information relating to the operation of the vehicle, for example driver behaviour, and so on. In addition, exogenous information may include, for example, weather conditions, ambient temperature, vehicle internal temperature, traffic conditions, or road conditions, and so on. In general, the exogenous information may be considered to be associated with an EV(s). This exogenous information may generally include information other than starting SoC and distance traveled since the last measured SoC. Embodiments according to the present disclosure may assist fleet operators and energy management systems in their decisions in absence of real-time and/or historical SoC information of the vehicles.

According to an aspect, the present disclosure relates to a system and method for data-driven EV SoC estimation. In at least some embodiments, the estimation is model-free, meaning that it does not rely on a predefined model of the EV SoC based on exogenous variables that is pre-programmed into the system, and instead, it uses a data-driven approach and thus may adapt to situational and systemic changes utilizing historical and/or real-time data.

According to an aspect, an EV SoC estimation may be done in real-time or near real-time. The estimation may be based on real-time, near real-time, and/or streaming data associated with the EV. This can include when the EV is in an operational state. Real-time estimations of SoC of EVs may be used, for example, by a fleet management system to monitor, control, or manage the fleet system, including in real-time. A control system that performs optimizations may be referred to as a vehicle fleet control optimization system. Furthermore, estimations of SoC of EVs may be used for any other suitable purpose.

Moreover, in at least some embodiments, systems and methods may be implemented using a distributed internet-of-things (IoT) platform. In an embodiment, at least part of the system may be implemented in the cloud. In an embodiment, the system may comprise a center module and one or more edge modules. The edge module(s) may interface with another system, for example a fleet operation system.

The present disclosure generally relates to improvements in computer-based energy asset management technologies. Further, the present disclosure generally relates to improvements in machine learning based estimation technologies, for example for estimating telematics related data associated with one or more vehicles. Furthermore, the present disclosure generally relates to improvements in management or control system technologies for managing or controlling a plurality of assets, for example EVs. Additionally, the present disclosure relates other aspects and features. In an aspect, an improvement may be in the form of an ability for the system to provide more accurate estimates of data associated with one or more assets in the system. In an embodiment, the data may comprise telematics data and the assets may comprise EVs. More accurate estimates of data associated with the assets may enable a control system to provide more efficient or effective control of the assets. In this sense, the disclosure provides improvements in vehicle or fleet control system technologies.

According to an aspect, the present disclosure is directed to a method comprising at one or more electronic devices each having one or more processors and memory, receiving exogenous information associated with an electric vehicle (EV), wherein the EV comprises a battery, wherein the exogenous information consists of information that is exogenous to the battery of the EV, and wherein at least some of the exogenous information corresponds to when the EV is in an operational state, and estimating, using a machine learning based estimator, state of charge (SoC) information of the battery of the EV while the EV is in an operational state based on the exogenous information.

In an embodiment, the exogenous information comprises weather data relating to weather conditions and/or weather forecast information in a geographical area in which the EV is operating.

In an embodiment, the exogenous information comprises geo data relating to traffic conditions in a geographical area in which the EV is operating.

In an embodiment, the exogenous information comprises driver behavior data associated with operation of the EV by the driver relating to rate of vehicle acceleration and/or vehicle speed.

In an embodiment, the at least some of the exogenous information received while the EV is in an operational state comprises live data.

In an embodiment, the method further comprises training the machine learning based estimator using supervised learning and using historical exogenous information associated with a plurality of EVs.

In an embodiment, the method further comprises providing the estimated SoC information to a vehicle fleet control optimization system, and controlling a fleet of EVs using the vehicle fleet control optimization system and based on the estimated SoC information.

According to an aspect, the present disclosure is directed to a system comprising one or more processors, and memory storing instructions for execution by the one or more processors, the instructions for operations comprising receiving exogenous information associated with an electric vehicle (EV), wherein the EV comprises a battery, wherein the exogenous information consists of information that is exogenous to the battery of the EV, and wherein at least some of the exogenous information corresponds to when the EV is in an operational state, and estimating, using a machine learning based estimator, state of charge (SoC) information of the battery of the EV while the EV is in an operational state based on the exogenous information.

In an embodiment, the exogenous information comprises weather data relating to weather conditions and/or weather forecast information in a geographical area in which the EV is operating.

In an embodiment, the exogenous information comprises geo data relating to traffic conditions in a geographical area in which the EV is operating.

In an embodiment, the exogenous information comprises driver behavior data associated with operation of the EV by the driver relating to rate of vehicle acceleration and/or vehicle speed.

In an embodiment, the at least some of the exogenous information received while the EV is in an operational state comprises live data.

In an embodiment, the instructions for operations further comprise training the machine learning based estimator using supervised learning and using historical exogenous information associated with a plurality of EVs.

In an embodiment, the instructions for operations further comprise providing the estimated SoC information to a vehicle fleet control optimization system, and controlling a fleet of EVs using the vehicle fleet control optimization system and based on the estimated SoC information.

According to an aspect, the present disclosure is directed to a non-transitory computer-readable medium having computer-readable instructions stored thereon, the computer-readable instructions executable by at least one processor to cause the performance of operations comprising receiving exogenous information associated with an electric vehicle (EV), wherein the EV comprises a battery, wherein the exogenous information consists of information that is exogenous to the battery of the EV, and wherein at least some of the exogenous information corresponds to when the EV is in an operational state, and estimating, using a machine learning based estimator, state of charge (SoC) information of the battery of the EV while the EV is in an operational state based on the exogenous information.

In an embodiment, the exogenous information comprises weather data relating to weather conditions and/or weather forecast information in a geographical area in which the EV is operating.

In an embodiment, the exogenous information comprises geo data relating to traffic conditions in a geographical area in which the EV is operating.

In an embodiment, the exogenous information comprises driver behavior data associated with operation of the EV by the driver relating to rate of vehicle acceleration and/or vehicle speed.

In an embodiment, the at least some of the exogenous information received while the EV is in an operational state comprises live data.

In an embodiment, the computer-readable instructions for operations further comprise training the machine learning based estimator using supervised learning and using historical exogenous information associated with a plurality of EVs.

In an embodiment, the computer-readable instructions for operations further comprise providing the estimated SoC information to a vehicle fleet control optimization system, and controlling a fleet of EVs using the vehicle fleet control optimization system and based on the estimated SoC information.

Aspects and advantages according to the present disclosure will be apparent from the following, taken in conjunction with the accompanying drawings, wherein are set forth, by way of illustration and example only, certain embodiments according to the present disclosure.

Figure 1:
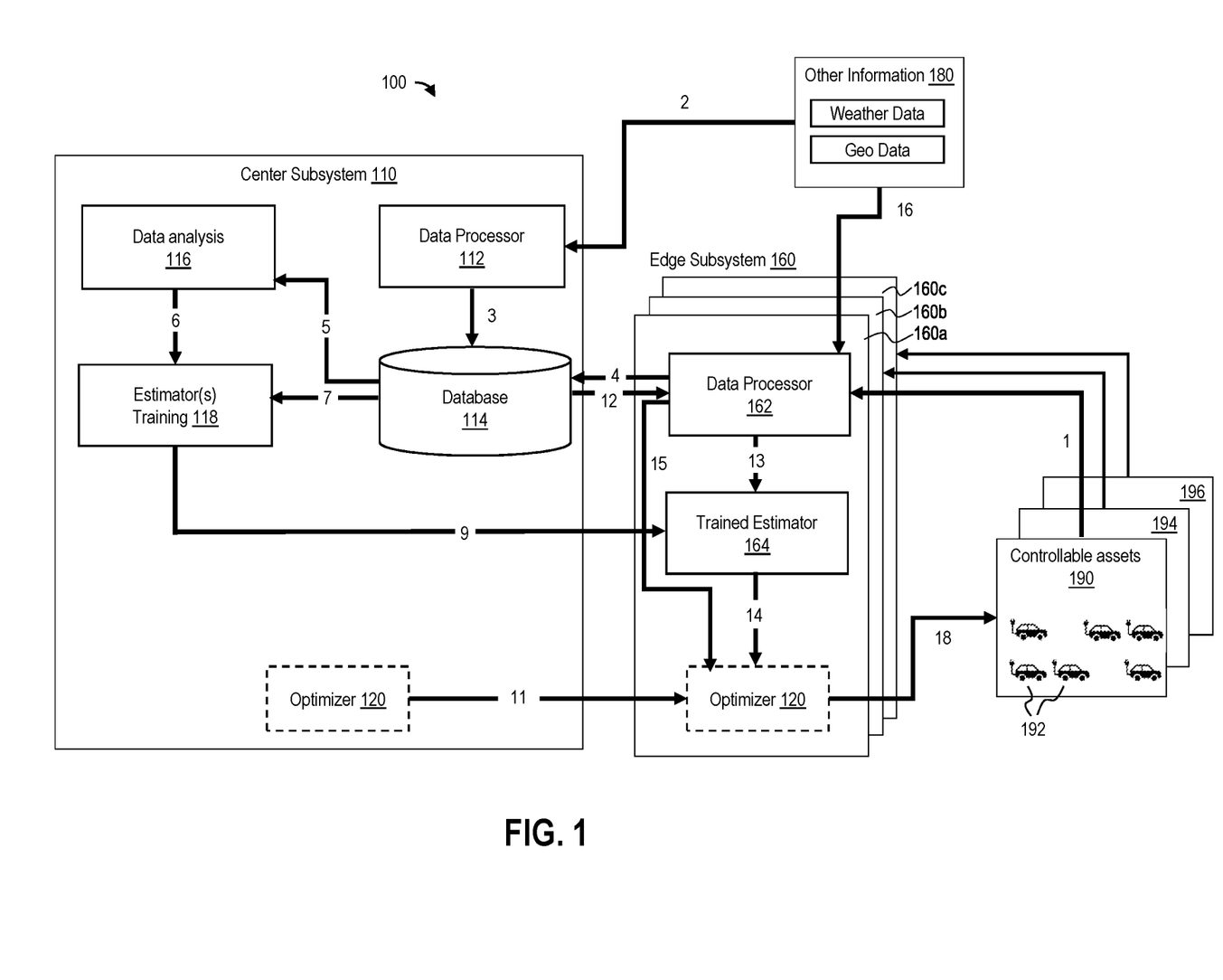
FIG. 1 is a block diagram of an example system for estimating data relating to one or more controllable assets.

FIG. 1 is a block diagram of an example system 100 for estimating data relating to one or more controllable assets 190. In this example embodiment, the controllable assets include one or more vehicles, which may be vehicles in a vehicle fleet system. Vehicles may include EVs 192. EVs may be any type or types of vehicles. They may include trucks, cars, buses, motorcycles, trains, boats, ships, other watercraft, airplanes, helicopters, other aircraft, and space craft. The vehicles may be manually operated vehicles and/or autonomous vehicles.

Figure 2:
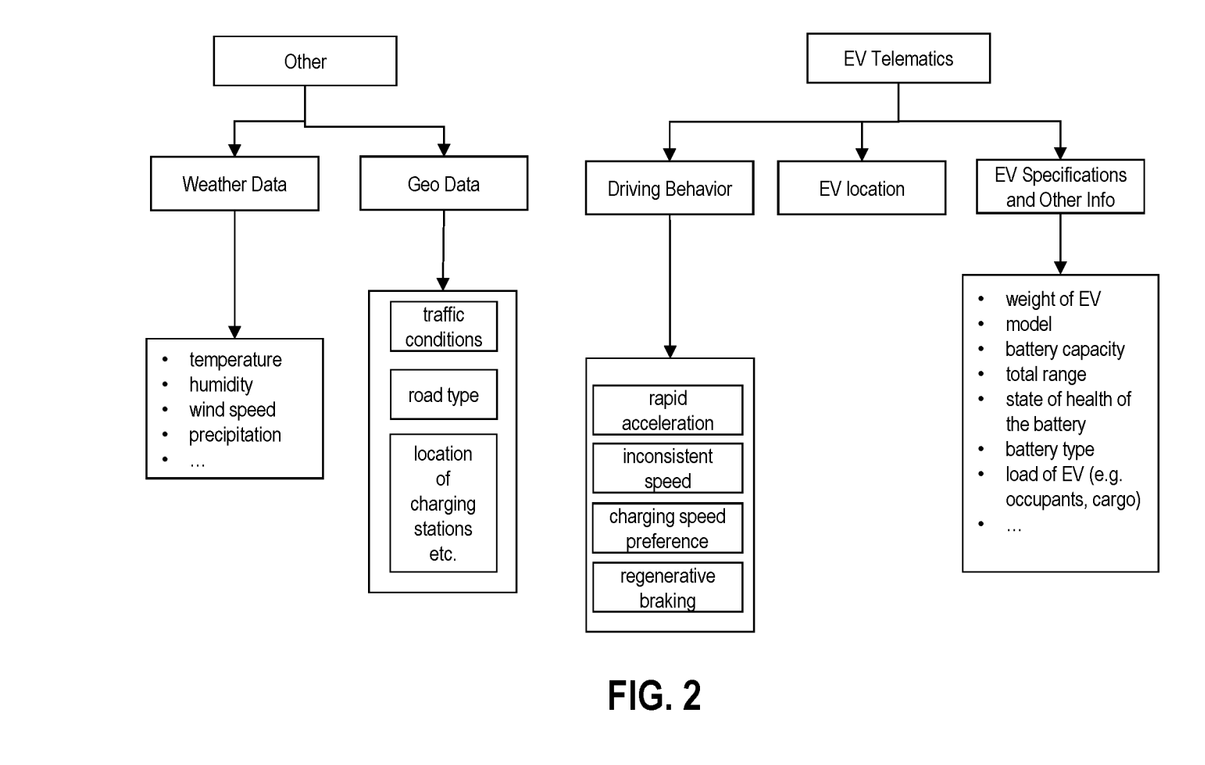
FIG. 2 is a diagram showing various example types of information that may be used to produce an estimate.

In general terms, system 100 may be configured with an estimator module or subsystem 164 for estimating telematics data based on a set of information relating to or associated with the EVs. The estimated telematics data may include any suitable type of data, including but not limited to battery SoC information or battery energy level for one or more EVs. Furthermore, the information on which the estimation is based may include any suitable type(s) of information, for example one or more of specification data relating to the EV, weather related data, geo data, location data of the EV, and/or driving behavior. FIG. 2 is a diagram showing various example types of such information.

Reference is again made to FIG. 1. In an embodiment, estimator 164 may be a machine learning based system, and thus may be trained using training data. The training data may include one or more of historical data associated with one or more EVs and historical environment data. Furthermore, the training data may include live data associated with one or more EVs and/or live environment data. In an embodiment, the estimated telematics data may be used by a vehicle control system, for instance a fleet management system, for controlling one or more aspects relating to the vehicles.

In this embodiment, system 100 is shown as comprising center subsystem 110 and edge subsystem 160, which may cooperate to perform estimations of vehicle telematics data, such as estimations of SoC of one or more EVs. It is to be appreciated, however, that in other embodiments, system 100 may not be subdivided into center subsystem 110 and edge subsystem 160 as herein shown and described, or subdivided at all. In other words, the subdivision into center subsystem 110 and edge subsystem 160 is in no way meant to be limiting.

Center subsystem 110 may be tasked with performing operations such as training one or more machine learning systems for use in the estimation of vehicle telematics data, as well as processing, cleaning, and/or storing data. Center subsystem 110 may generally comprise, in at least one embodiment, one or more of data processor module 112, database or data repository 114, data analysis module 116, and estimator training module 118.

Edge subsystem 160 may be tasked with, among other things, performing inference operations of one or more trained machine learning systems for the estimation of vehicle telematics data. Edge subsystem 160 may generally comprise, in at least one embodiment, one or more of data processor 162, and estimator 164.

Center subsystem 110 may receive various types of information from various sources. The data or other information may be historical data and/or live data. For example, center subsystem 110 may receive information 180, represented by signal 2, such as weather related data and/or geo data, or any other suitable information. This information may be generally referred to as environment data, although other types of information may also be included. Further, other types of environment data may include, for example, information on renewable energy generation and availability, energy grid operational parameters, electric vehicle and/or vehicle depot information, energy market information, route manager information relating to vehicles, renewable energy information, and/or energy pricing information.

Weather related data may include one or more of current weather conditions, recent weather conditions, historical weather information, and/or weather forecasts. For example, weather conditions may affect the rate of battery energy use by EVs. For example, traffic may travel at a slower average speed during winter months in climates that get snow or freezing rain, or during certain types of weather such as snow, rain, or fog. This may be represented in one or more of historical weather, current weather, and weather forecasts. Other types of weather that may be indicated in weather information may include fog, wind speed, light levels, precipitation, humidity, low temperatures, high temperatures, etc. Weather data may affect traffic conditions, for instance fewer vehicles on the road could be expected during a snow storm. In addition, weather may affect battery energy usage by EVs, for instance for increased energy usage for vehicle heating when the ambient temperature is low, or for windshield wiper operation when there is precipitation, or for vehicle propulsion on wet or snowy roads, or when there is wind. Weather related data may include any other types of suitable information.

Geo data may include, for example, traffic conditions, road conditions, road types, or location information. Traffic related information may comprise current and/or recent traffic conditions, historical traffic information, and/or traffic predictions or forecasts. Traffic information may include but is not limited to traffic congestion information, which may affect the mobility of EVs. For instance, high traffic may result in slower EVs travel speeds or EV idling, which consumes energy, while low traffic may result in higher EV travel speeds. Further, traffic information may include any of lane closures, road closures, construction, toll stations, vehicle accident information, or any other suitable type of traffic information. Road type information may include the nature or terrain of the road, for example neighbourhood road, major artery road, highway, freeway, gravel road, dirt road. Road conditions information may include information about, for example, whether a road is in good or poor condition, is straight or windy road, elevation of road, elevation changes in road, and so on. Location information may include information any sort of suitable information, such as locations of any accidents, or locations of charging stations including any charging stations located on a predetermined route of the EV. Geo data may include any other types of suitable information.

Data processor 112 may perform data cleaning, data warehousing or other operations on received data. Data received by data processor 112 may be cleaned, conditioned, or otherwise modified. Data processor module 112 may transform data into a format more suitable for machine learning techniques, such as supervised learning. Data from data processor 112 may be provided to another module, represented by signal 3, of center subsystem 110, such as database 114.

Data and other information at center subsystem 110 may be stored in one or more repository databases, for example database 114. The stored data may include historical time-series data. A database may comprise one or more databases stored on one or more computing devices.

Further, center subsystem 110 may receive data. The data may comprises EV telematics data The received data may be first obtained at edge subsystem 160, as represented by signal 1. The data may be processed by data processor 162 of edge subsystem 160, and then provided to center subsystem 110, represented by signal 4. In another embodiment, data relating to the EVs may be received by center subsystem 110 without passing through edge subsystem 160. Such data may be processed by data processor 112 before being stored by database 114. Some or all of the data stored in database may be referred to as historical data.

The data relating to EVs 192 may include specification data relating to the EV, for example one or more of the type of EV, type of battery, range of the EV, EV model, weight of the EV, battery capacity of the EV, nominal range of the EV, state of health of the EV battery, battery type, EV load size (may include fix EV weight or variable weight of occupant(s)), and so on. This information may have an impact on a SoC of an EV, for example a rate at which the SoC declines. As a mere example, for passenger EVs, the more passengers onboard, the heavier the EV and thus the higher the energy consumption rate of the EV.

Furthermore, the data relating to the EVs 192 may include EV location information, which may include information on a current, past, or future location of an EV. The information could include GPS coordinates. Again, some of this information may affect, for example, an expected energy usage of EVs, or a rate of energy use, which in turn may affect the SoC of these EVs. Furthermore, the data relating to the EVs 192 may include driving behavior related information, for example rate of acceleration of the EV (for example, slow, medium, or rapid acceleration), instantaneous or average speed of EV, inconsistent speeds of the EV, whether regenerative braking is employed, charging speed preference, or any behavioral patterns of a driver in controlling an EV, and so on. These factors may have an impact on a SoC of an EV, for instance a rate at which energy is used, or replaced in the case of regenerative braking for example.

In addition, the data relating to EVs 192 may include EV streaming data. Further, the data may include information relating to the status of EVs 192. Further, the data may comprise measurements of EVs, which may be updated each of a plurality of time steps k, for example charging transaction information such as vehicle ID, charger ID, start SOC, stop SOC, arrive time, depart time, start charge time, end charge time, charge duration, and so on. Further, other example types of data include dynamic attributes of assets, for example fault conditions.

Data, for example from database 114, may be provided to data analysis module 116, as represented by signal 5. Data analysis module 116 may be configured to perform one or more of data processing and feature selection. These are described below in relation to FIG. 3.

Estimator training module 118 may train one or more estimators 164 that may be used for performing the estimating, for example of the SoC of one or more EVs.

Training of an estimator 164 may be done in any suitable way(s). In general, in an embodiment, estimator training module 118 may use any suitable machine learning techniques. In general, in an embodiment, estimator training module 118 may use one or more machine learning and/or deep learning techniques, such as for example linear regression, neural networks, support vector machine, multi-layer perceptron, decision-trees, to name but a few. Estimator training module 118 generally receives labeled data and trains a model(s) to estimate or predict the label(s) of the data. In an embodiment, the label relates to SoC of a battery of one or more EVs.

The training may be performed using any suitable training data obtained from any suitable location. Estimator training module 118 may acquire and use data from data analysis module 116, as represented by signal 6, and/or from database 114, as represented by signal 7, as training data. In an embodiment, historical exogenous information associated with one or more EVs is used for the training. In an embodiment, this data is labelled with historical SoC data. Furthermore, in some embodiments, in addition to historical information, some live data may also be used in the training. In this regard, the training involves some online training.

Figure 3:
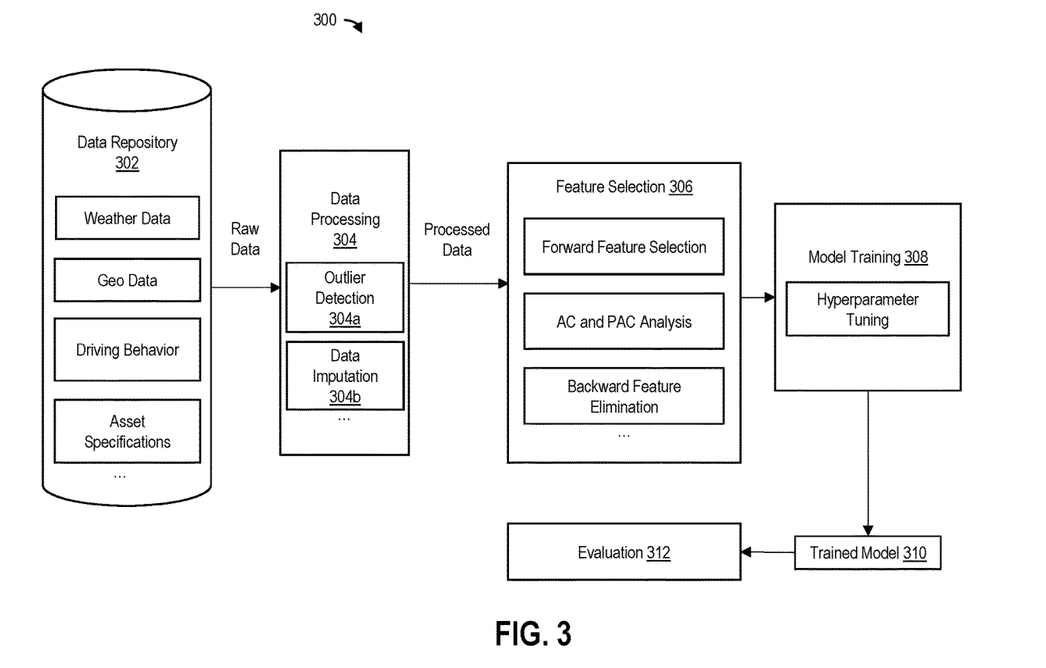
FIG. 3 is a diagram showing an example of how training of an estimator may be performed.

FIG. 3 is a diagram showing an example of how training of an estimator may be performed. Example system 300 comprises several modules. However, system 300 may be organized in any other suitable manner with any number of suitable modules. Data repository 302 may correspond to database 114 in FIG. 1, and thus may comprise data such as one or more of weather data, geo data, driving behavior, and/or EV specification information. These types of information or data were described above.

Data processing module 304 may process data, for example data obtained from repository 302. The processing may result in data that is suitable for training and/or use by an estimator. Data processing module 304 may comprise one or more submodules or processes, for example an outlier detection module 304a, or a data imputation module 304b. Outlier detection module 304a may remove data points that are significantly different from the rest of the data, and imputation module 304b may replace missing data with substitute values.

Feature selection module 306 may select one or more features in the processed data that will be used by the estimator. The feature(s) may be the one having a high predictive power. The other features may be removed from the dataset. Various techniques may be used in feature selection, including but not limited to one or more of forward feature selection, auto correlation (AC) and partial auto correlation (PAC) analysis, and backward feature elimination. In an embodiment, data analysis 116 module in FIG. 1 may generally comprise one or both of a data processing module 304 and a feature selection module 306.

Model training module 308 may correspond to estimator training module 118 in FIG. 1. Model training module 308 trains an estimator, which may be a data-driven model, using any suitable data, as previously described above in relation to estimator training module 118. Further, the estimator may be tuned, for example using a grid-search method to find the optimum values of the hyperparameters.

Trained model 310, which may correspond to trained estimator 164 in FIG. 1, may be used to estimate data relating to EVs 192, as previously described.

Evaluation module 312 may be used to evaluate an existing trained model and, if appropriate, to update the trained model, for example as the system operates. The updating may be done in an attempt to improve the accuracy of the trained model. Thus, if the performance of the trained model is satisfactory, then the trained model is ready to be used or if already in use, it may be continued to be used. If the performance of the trained model is not satisfactory, then the model may be adjusted or a new model may be generated. Whether or not the performance is satisfactory may be assessed by using some predefined value or threshold. Further, performance may be assessed in view of any suitable criterion or criteria, for example model accuracy in how closely the trained model estimates SoC information in view of actual SoC information. This may use labeled data in the training data.

In an embodiment, the training process uses labeled datasets to train an algorithm for estimating the SoC. As the labeled dataset is fed into the model, it adjusts its weights and biases (or any learnable parameter thereof) until the model has been fitted appropriately. The training dataset may include historical features, for example such as driving behavior, traffic conditions, travelled distance, etc., and historical labels (such as SoC) measurements associated with the feature set, allowing the model to learn over time. The algorithm may measure its accuracy, for example through a predefined performance matrix such as loss function, adjusting until the prediction error has been sufficiently minimized or the prediction accuracy is sufficiently maximized.

In an embodiment, more than one estimator may be trained and/or used, for example if estimations of more than one type of telematics data is desired.

Reference is again made to FIG. 1. Once an estimator has been trained by estimator training module 118, the trained estimator 164 may be provided to, or otherwise made available to, edge subsystem 160, as shown in FIG. 1 and as represented by signal 9. In an embodiment, rather than providing an entire estimator to edge subsystem 160, configurations parameters for the estimator may be provided. In an embodiment, a copy of trained estimator 164 may be stored at center subsystem 110.

Edge subsystem 160 is now described.

Edge subsystem 160 may generally comprise at least one or more of a data processor module 162, and trained estimator 164. Edge subsystem 160 may be adapted to receive data from EVs 192 and optionally any other suitable data, as represented by signal 1, and/or information from database 114 as represented by signal 12, and/or data or information 180 from other sources, as represented by signal 16. In an embodiment, at least some of the information may be streaming data, real time data, and/or live data.

Data processor module 162 may generally be similar in function to data processor module 112 of center subsystem 110. As such, data processor module 162 may perform operations on data received by edge subsystem 160, such as data relating to EVs 192 and/or data possibly from other sources such as information 180.

Estimator 164 may comprise one or more trained estimators, which may originate from center subsystem 110.

Estimator 164 may be configured for estimating data relating to one or more assets 190. In an embodiment, at least some of the estimated data relates to vehicle telematics information relating to EVs 192. In an embodiment, estimated vehicle telematics information includes SoC information of one or more EVs 192.

Estimator 164 may obtain data from any suitable source for use in performing estimations, for example estimations of SoC of EVs. In an embodiment, estimator 164 may estimate SoC information of a battery of an EV based on exogenous information associated with the EV, wherein the exogenous information consists of information that is exogenous to the battery. Again, exogenous information may generally refer to information that is not indicative of a current physical state of the battery. In an embodiment, exogenous information may include one or more of other types of information 180, including environment data, and information relating to EVs 192, which may include any telematics data associated with EVs 192 that is available to a fleet operator.

In different embodiments, any suitable types of information may be used in any suitable ways to estimate SoC information of EVs. The following examples are non-limiting and are provided for illustrative purposes only. Different types of data may have different impacts on a SoC of an EV. For example precipitation, such as rain or snow, can decrease the friction between the road and the wheels of the EV, which typically causes the EV to use more energy. Another type of information is ambient temperature. Batteries typically perform best in temperatures ranging from around 15 C. to 25 C. In extreme temperatures, the capacity of a battery usually drops. Also, if the ambient temperature is low, then the battery may consume energy heating itself up. Another type of information is traffic. Higher traffic often requires more braking and inconsistent speeds, which typically consume more energy than an EV travelling at a moderate and consistent speed. Another type of information is road type. For example, an inclined road causes the EV to consume more energy than a level road. Furthermore, a declined section of road may enable some battery charging through regenerative braking. In summary, one or more various types of exogenous information may be used to enable more accurate estimations of EV SoC information by computerized systems used to generate such estimations or by overall computerized fleet management or fleet control or optimization systems.

Estimations may be performed while the EV is in an operational state, meaning when actual SoC information of the battery is not available to a fleet operator. Information on which an estimation is based may include one or more of specification data relating to the EV, weather related data, geo data, EV location data, and/or driving behavior. These types of information were previously described. At least some of this information may be live or streaming data that is received at estimator 164 in real time or near real time. In an embodiment, at least some of this information may be historical information, for example from database 114 and/or other sources 180.

Again, in an embodiment, SoC information of an EV may be available to a fleet operator when the EV is plugged into or otherwise connected to a charging station and thus the EV is not in an operational state. Thus, there may not be any desire to estimate the SoC of the EV when the SoC of the EV is available to the fleet operator. However, when an EV is not plugged into a charging station, SoC information of an EV may not be available to the fleet operator. In an embodiment, when an EV is not connected with a charging station, the EV may be considered to be in an operational state, even if the EV is turned off. In such situations, it may be desirable to estimate the SoC of the EV. In this example, whether an EV is in an operational state or not in an operation state is based on whether the EV is connected to a charging station. However, in other embodiments, whether an EV is in an operational state may be based on one or more alternative or additional criteria.

Estimator 164 uses the obtained information as input and generates an output using its trained model(s). In an embodiment, the output may be one or more values representing SoC information relating to one or more EVs.

Estimator 164 may estimate SoC information at any suitable times, for example periodically, at non-uniformly spaced time periods, and/or in response to triggering events. In an embodiment, estimations may be performed every x second(s), every x minute(s), every x hour(s), or any other suitable time intervals. An example triggering event may be when a parameter exceeds above or drops below a defined threshold, or when a signal is received.

Figure 4:
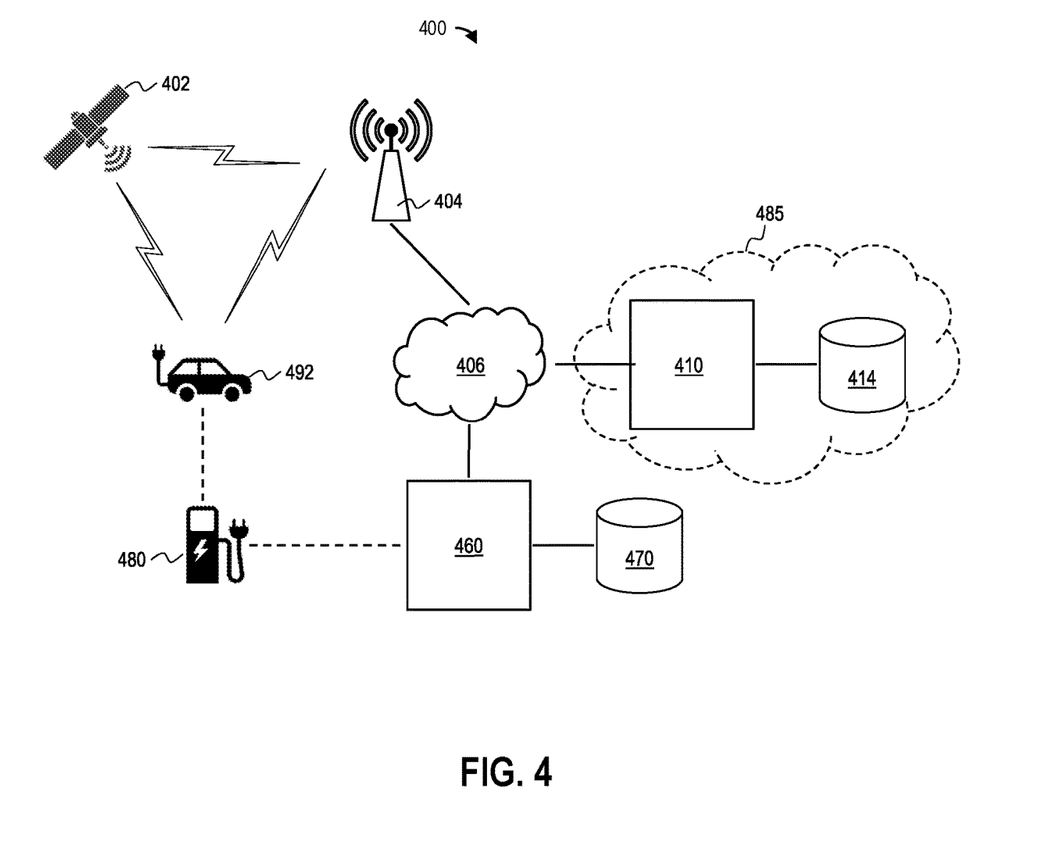
FIG. 4 is a block diagram of an example system showing how vehicle telematics information and other information may be communicated.

FIG. 4 is a block diagram of an example system 400 showing how vehicle telematics information and other information may be communicated. System 400 comprises an EV 492, center subsystem 410, and edge subsystem 460. Center subsystem 410 may comprise or communicate with database 414, and edge subsystem 460 may comprise or communicate with database 470.

EV 492 may receive and send information wirelessly, for example with a wireless access point 404, such a cellular tower or other network access point, or with a satellite 402, for example for receiving GPS information. Wireless access point 404 and satellite 402 may be in communication with other network devices or computing devices, for example edge subsystem 460 or center subsystem 410. EV 492 may communicate with a charging station 480, for example when it is connected to charging station 480. When EV 492 is not in an operational state, for example when EV 492 is connected to charging station 480 and/or is located at a fleet depot location or another location, telematics data of EV 492 may be accessible to a fleet operator. In an example, vehicle may communicate telematics information, that it has saved while in an operational state, to another device or system such as charging station 480 or edge subsystem 460. This information may include data that is not available to the fleet operator when EV 492 is in an operational state. Charging station 480 may communicate with any other device or subsystem, for example edge subsystem 460.

One or more of the devices or systems in system 400 may communicate via any communication means, including over a network 406. In an embodiment, at least part of system 400 may be implemented in the cloud, meaning a cloud computing environment. As a mere example, center subsystem 110 may be implemented at least partly in the cloud, as represented by cloud 485. Furthermore, the devices and systems in system 400 may communicate with each other or with other entities in ways other than those depicted in FIG. 4.

EV 492 may comprise a computing device or system with a communications subsystem for obtaining, acquiring, or collecting telematics data from or about the vehicle, and for communicating telematics data and any other information to another device or system, such as any of those of FIG. 4 The computing system of EV 492 may also perform any other suitable operations, including receiving information or data, including control related information. The computing device or system may be part of the vehicle or may be a separate system that communicates with computing components or sensors of the vehicle over a communications interface, for example via a vehicle on board diagnostic (OBD) port.

Reference is again made to FIG. 1. Furthermore, in some embodiments, system 100 may include or otherwise communicate with at least one other system or processing modules 120, which may perform one or more of calculations, functions, optimizations, provide control, and provide management, for example for some other purpose. For simplicity, but without limitation, this other system or processing module will be referred to as optimizer 120 and its processing will be referred to as optimization. However, it is to be appreciated that optimizer 120 may perform any type of processing and is not limited to optimizations. In an embodiment, optimizer 120 may be configured for performing operations to optimize for one or more parameters in an optimization or control system. Optimizer 120 may be configured for providing control over a vehicle fleet system. Such a system could include a vehicle fleet management system, or an energy management system, or an EV fleet energy management system, as non-limiting examples. In an embodiment, a vehicle fleet management system may be configured to optimize operations of the fleet. In an embodiment, an EV fleet energy management system may be used to provide optimal energy management of EVs in a fleet, for instance to maximize economic and environmental benefits. In an embodiment, an optimizer pay provide control in relation to a plurality of controllable assets, where a subset of those controllable assets are EVs. Estimated SoC information relating to the EVs may be used by the optimizer. In an embodiment, a plurality of controllable assets may include several subsets of controllable assets. An optimizer may provide control of all of the controllable assets. In another embodiment, different optimizers may be used to control each respective subset of controllable assets. Other combinations and configurations are contemplated.

Optimizer 120 may be a machine learning based system, which builds a model using training data. In an embodiment, optimizer 120 may be trained using training data at center subsystem 110. Optimizer 120 may be provided to and deployed at edge subsystem 160, for example via signal 11. In an embodiment, optimizer 120 may take as input estimations provided by estimator 164, as represented by signal 14, and/or data from data processor 162, as represented by signal 15. As a mere example, optimizer 120 may make decisions to optimize for one or more objectives for an EV fleet system based at least in part on estimated SoC information for EVs in the fleet. A copy of a trained optimizer may be stored at center subsystem 110.

System 100 may provide for control of assets, for example but not limited to EVs, by providing information, for example relating to optimizer 120, to edge subsystem 160. However, information for controlling assets 190 may be provided to assets 190 in ways other than those shown in FIG. 1. Further, edge subsystem 160 may provide for control of assets 190 using optimizer 120. Optimizer 120 may generate control decisions or actions based on optimization computations, such control decisions or actions may be communicated to assets 190, for example as represented by signal 18. Further, optimizer 120 may be adapted to perform operations other than optimization computations, for example other processing and/or control functions. Further, center subsystem 110 and/or edge subsystem 160 may provide for control of assets 190 in other ways, for example by providing control decisions or actions, or other control related information (such as planning limits), to assets 190.

Optimizer 120 may comprise one or more trained optimizers, which may be configured to solve one or more control optimization problems related to EVs 190, for example by minimizing or maximizing an objective function. An optimizer may be of any suitable type or types, for example: linear program, mixed integer nonlinear program, data driven optimizer, stochastic programming etc. Once an optimal value(s) of a decision variable is determined, assets 190 may be controlled based on the optimal value, for example by providing the optimal value and/or indicating actions to EVs 190, as represented by signal 18.

Controlling assets in a system may include performing an optimization in relation to those assets. Optimizations may relate to controlling assets in the system such as EVs. Some examples of types of optimizations in a system may relate to scheduling of EV charging and may include maximizing the SoC of EVs at the end of a given time period, minimizing cost of charging electric vehicles, maximizing the charging efficiency of vehicles, increasing the use of certain types of energy such as locally generated renewable energy, etc. Other examples of types of optimizations may include scheduling the use of EVs, for example based on one or more of the SoC of the EVs, the routes that must be performed, the types of EVs, and so on.

Optimizer 120 may perform its optimization or other calculation or processing at any suitable times, for example periodically, at non-uniformly spaced time periods, and/or in response to triggering events. For example, the optimization or other calculation or processing may be performed every x second(s), every x minute(s), every x hour(s), or any other suitable time intervals. An example triggering event may be when a parameter exceeds above or drops below a defined threshold, or when a signal is received.

In an embodiment, to support scalability, in that assets are numerous and perhaps geographically dispersed, a system according to the present disclosure may have a hierarchical structure, for example a center-edge architecture. In this regard, in an embodiment, the system may have a center subsystem and one or more edge subsystems. Some functions and features may be performed at the center subsystem while other functions and features may be performed at the edge subsystem(s). In an embodiment, at least part of the system may be implemented in a distributed internet of things (IoT) platform. In an embodiment, at least part of the system may be implemented in the cloud.

In an embodiment, a system according to the present disclosure may be used in association with a first set of assets, for example a first fleet of vehicles. The system may be trained using historical data that is from vehicles in the first fleet, or is otherwise appropriate for training the system. A similar system may be used in association with a second set of assets, for example a second fleet of vehicles. The system may be trained using historical data that is from vehicles in the second fleet, or is otherwise appropriate for training the system. In this way, the system may be easily scalable.

In an embodiment, as shown in FIG. 1, edge subsystem 160 may comprise a plurality of edge modules 160a, 160b, 160c. In this example, there are three edge modules, but in other embodiments there could be fewer or more edge modules. Each edge module may comprise one or more of: a data processor module 162, an estimator 164, an optimizer 120. Each edge module may communicate with center subsystem 110 and/or assets 190, 194, 196 and/or with each other, and may receive data from one or more other sources. In an embodiment, two or more edge modules may be configured to operate in parallel.

In an embodiment, each edge module 160a, 160b, 160c may be associated with a different group of assets, for example groups 190, 194, 196. Assets 190, 194, 196 and edge modules 160a, 160b, 160c connected to a center subsystem 110 may be distinct in nature, for example one may be associated with an EV fleet, one might be associated with an airport, and one may be associated with a gas-fired electric generating plant. Each edge module may be used to generate estimations, predictions, optimizations, or to perform other calculations. Each edge module may perform the operations in relation to its respective group of assets. Each edge module may be configured to provide control in relation to a respective group of assets. In an embodiment, an edge module may be configured to provide control to two or more groups of assets 190, 194, 196.

In an embodiment, one or more of the edge modules may be a primary control edge module(s) for controlling assets 190, meaning this edge module may exercise some central or overall control relative to the other edge module(s). This module may be referred to as a control edge module. In the embodiment of FIG. 1, the control module may be edge module 160a. Output(s) of one or more of other edge modules 160b, 160c may be provided to the control edge module 160a for use as inputs for controlling assets 190.

Center subsystem 110 may comprise, for example, one or more electronic or other computer processors, computer memories, computer storage devices for storing one or more databases 114, as well as other computer hardware. Center subsystem 110 may be configured to perform several tasks and operations, including receiving, maintaining and/or storing in database various types of data and information, as previously discussed.

Edge module(s), such as control edge module 160a, may comprise, for example, one or more electronic or other computer processors, computer memories, computer storage devices for storing one or more databases, and/or other computer hardware, and/or computer readable instructions executable by the processor(s) for causing operations and functions according to those herein described. Each of the other predictor edge modules 160b, 160c may be software modules, or may comprise both computer software and hardware. One or more edge modules 160a, 160b, 160c may be located remotely from center subsystem 100, and/or remotely from other edge modules.

Center subsystem 110 and edge subsystem 160 may be implemented on a single computing device, on separate computing devices, or on several computing devices. In an embodiment, center subsystem 110 and edge subsystem 160 may be implemented in a distributed computing system wherein operations are performed at each of two or more computing devices. Other options and configurations are possible.

In other embodiments, the functions, operations, and/or structures of center subsystem 110 and edge subsystem 160 may not be divided as between the two subsystems 110 and 160 as shown and described with reference to FIG. 1. For example, some or all of the functions, operations, and/or structures of edge subsystem 160 may be located or performed at center subsystem 110. Alternatively, some or all of the functions, operations, and/or structures of center subsystem 110 may be located or performed at edge subsystem 160. Alternatively, the system could have only a single subsystem, which has all of the functions, operations, and/or structures of both subsystems 110, 160 described herein. Other configurations are also possible.

Figure 5:
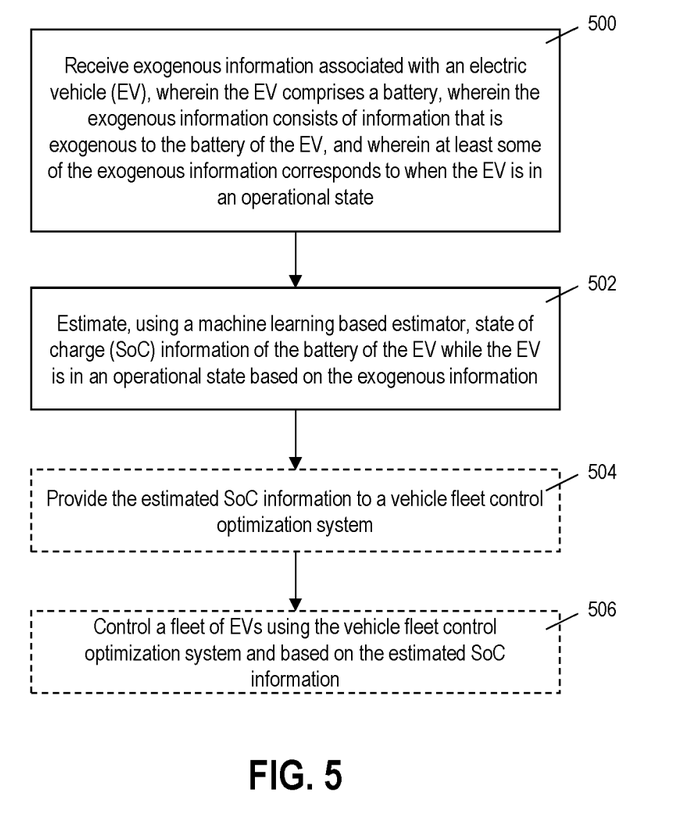
FIG. 5 is a process flow diagram of an example method.

FIG. 5 is a process flow diagram of an example method. The example method may be performed at or by one or more electronic devices each having one or more processors and memory.

At block 500, the process involves receiving exogenous information associated with an electric vehicle (EV), wherein the EV comprises a battery. The exogenous information may consists of information that is exogenous to the battery of the EV, and at least some of the exogenous information corresponds to when the EV is in an operational state.

At block 504, the process may involve estimating, using a machine learning based estimator, state of charge (SoC) information of the battery of the EV while the EV is in an operational state based on the exogenous information.

Furthermore, FIG. 5 shows some example optional aspects. For example, at block 506, the process may comprise providing the estimated SoC information to a vehicle fleet control optimization system.

At block 508, the process may comprise controlling a fleet of EVs using the vehicle fleet control optimization system and based on the estimated SoC information.

In an embodiment, the exogenous information may comprise weather data relating to weather conditions and/or weather forecast information in a geographical area in which the EV is operating. In an embodiment, the exogenous information may comprise geo data relating to traffic conditions in a geographical area in which the EV is operating. In an embodiment, the exogenous information may comprise driver behavior data associated with operation of the EV by the driver relating to rate of vehicle acceleration and/or vehicle speed. In an embodiment, the at least some of the exogenous information received while the EV is in an operational state comprises live data. In an embodiment, the process may comprise training the machine learning based estimator using supervised learning and using historical exogenous information associated with a plurality of EVs. In an embodiment, the process may comprise providing the estimated SoC information to a vehicle fleet control optimization system, and controlling a fleet of EVs using the vehicle fleet control optimization system and based on the estimated SoC information.

Again, FIG. 5 is a process flow diagram of an example method, and is not meant to be limiting.

In an embodiment, a method is provided comprising at one or more electronic devices each having one or more processors and memory receiving exogenous information associated with an asset, wherein the asset comprises a battery, wherein the exogenous information consists of information that is exogenous to the battery of the asset, and wherein at least some of the exogenous information corresponds to when the asset is in an operational state, and estimating, using a machine learning based estimator, one or more parameters of the battery of the asset while the asset is in an operational state based on the exogenous information. In an embodiment, the one or more parameters may include state of charge (SoC) information relating to the battery.

In an embodiment, a system is provided comprising one or more processors, and memory storing instructions for execution by the one or more processors, the instructions for operations comprising receiving exogenous information associated with an asset, wherein the asset comprises a battery, wherein the exogenous information consists of information that is exogenous to the battery of the asset, and wherein at least some of the exogenous information corresponds to when the asset is in an operational state, and estimating, using a machine learning based estimator, one or more parameters of the battery of the asset while the asset is in an operational state based on the exogenous information. In an embodiment, the one or more parameters may include state of charge (SoC) information relating to the battery.

In an embodiment, a non-transitory computer-readable medium is provided having computer-readable instructions stored thereon, the computer-readable instructions executable by at least one processor to cause the performance of operations comprising receiving exogenous information associated with an asset, wherein the asset comprises a battery, wherein the exogenous information consists of information that is exogenous to the battery of the asset, and wherein at least some of the exogenous information corresponds to when the asset is in an operational state, and estimating, using a machine learning based estimator, one or more parameters of the battery of the asset while the asset is in an operational state based on the exogenous information. In an embodiment, the one or more parameters may include state of charge (SoC) information relating to the battery.

In some embodiments, algorithms, techniques, and/or approaches according to the present disclosure may be performed or based on artificial intelligence (AI) algorithms, techniques, and/or approaches. This includes but is not limited to predictors and/or optimizers according to the present disclosure, as well as controlling of controllable assets.

In some embodiments, the AI algorithms and techniques may include machine learning techniques.

Machine Learning (ML) may be used in power or energy systems, including energy asset management systems, with penetration of renewable energy such as wind, solar, or tidal energy, to improve the utilization of variable renewable resources and coordinate consumption and demand. Machine learning systems may be used to estimate data associated with one or more assets for example telematics data associated with one or more EVs. Machine learning models may be used, as a mere example, to predict future resource availability and demand requirements, and/or control assets in a system, for instance using one or more optimizations. Predictions may be used to control or schedule charging interactions, to schedule EV charging, energy generation, storage, and/or pricing to optimally coordinate these energy systems to achieve various objectives such as cost minimization, efficiency maximization, or optimal use of local renewable energy. Further, predictors and/or optimizers, and the training thereof, may also use or be based on machine learning techniques.

A machine learning algorithm or system may receive data, for example historical data, streaming controllable asset data, environmental data, and/or third party data, and, using one or more suitable machine learning algorithms, may generate one or more datasets. Example types of machine learning algorithms include but are not limited to supervised learning algorithms, unsupervised learning algorithms, reinforcement learning algorithms, semi-supervised learning algorithms (e.g. where both labeled and unlabeled data is used), regression algorithms (for example logistic regression, linear regression, and so forth), regularization algorithms (for example least-angle regression, ridge regression, and so forth), artificial neural network algorithms, instance based algorithms (for example locally weighted learning, learning vector quantization, and so forth), Bayesian algorithms, decision tree algorithms, clustering algorithms, and so forth. Further, other machine learning algorithms may be used additionally or alternatively. In some embodiments, a machine learning algorithm or system may analyze data to identify patterns and/or sequences of activity, and so forth, to generate one or more datasets.

An energy asset management system may comprise one or more control policies. The control policies of the system may be based on trained machine learning based systems. In this sense, a control policy may be part of a control agent. A control agent observes its environment, herein referred to a control environment, and takes action based on its observations, or percepts, of the control environment. The taking of action is referred to as controlling the system. Depending on the state of the environment, taking action may involve taking no action at all, for example if there has been little or no change in the state since the last time the agent took action. Thus, doing nothing is a valid action in a set of actions in the action space of the controller. In an embodiment, the present systems and methods may exploit the flexibility of controllable assets in the power system to achieve improved performance of the system. For example, the flexibility of controllable assets may be exploited in response to changes in the control environment.

In an embodiment, online machine learning may be employed. Online machine learning is a technique of machine learning where data becomes available sequentially over time. The data is utilized to update a predictor for future data at each step in time (e.g. time slot). This approach of online machine learning may be contrasted to approaches that use batch learning wherein learning performed on an entire or subset of training data set. Online machine learning is sometimes useful where the data varies significantly over time, such as in power or energy pricing, commodity pricing, and stock markets. Further, online machine learning may be helpful when it is not practical or possible to train the agent over the entire or subset of data set.

In embodiments according to the present disclosure, training of a machine learning system, such as an estimator or optimizer, may be based on offline learning and/or online learning where the streaming real-time data may be combined with at least some data, for example from database 114 to train the machine learning system in real-time or near real-time.

Figure 6:
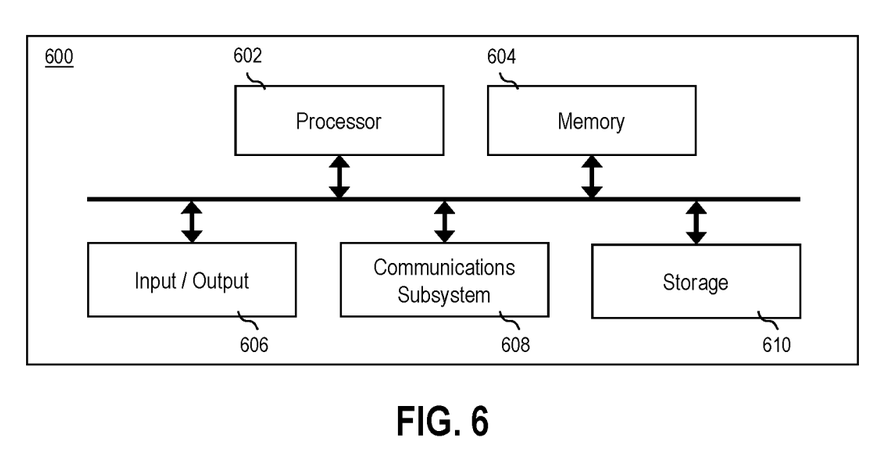
FIG. 6 is a block diagram of an example computerized device or system.

FIG. 6 is a block diagram of an example computerized device or system 600 that may be used in implementing one or more aspects or components of an embodiment according to the present disclosure. For example, system 600 may be used to implement a computing device or system, such as an estimator or controller, to be used with a device, system or method according to the present disclosure. Thus, one or more systems 600 may be configured to implement one or more portions of system 100 or system 100 in its entirety. This includes center subsystem 110 and/or edge subsystem 160, and/or edge modules 160*a*, 160*b*, 160*c*. Furthermore, a system 600 may be configured to implement a computing device system at a vehicle, for example to enable the collection of telematics data or to enable communication between the vehicle and other systems. A mere example is shown in FIG. 4.

Computerized system 600 may include one or more of a computer processor 602, memory 604, a mass storage device 610, an input/output (I/O) interface 606, and a communications subsystem 608. A computer processor device may be any suitable device(s), and encompasses various devices, systems, and apparatus for processing data and instructions. These include, as examples only, one or more of a programmable processor, a computer, a system on a chip, and special purpose logic circuitry such as an ASIC (application-specific integrated circuit) and/or FPGA (field programmable gate array).

Memory 604 may be configured to store computer readable instructions, that when executed by processor 602, cause the performance of operations, including operations in accordance with the present disclosure.

One or more of the components or subsystems of computerized system 600 may be interconnected by way of one or more buses 612 or in any other suitable manner.

The bus 612 may be one or more of any type of several bus architectures including a memory bus, storage bus, memory controller bus, peripheral bus, or the like. The CPU 602 may comprise any type of electronic data processor. The memory 604 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 610 may comprise any type of storage device configured to store data, programs, and other information and to make the data, programs, and other information accessible via the bus 612. In particular, device 610 may be configured to store one or more of repositories/databases 114, 414, 470. The storage device may be adapted to store one or more databases and/or data repositories, each of which is generally an organized collection of data or other information stored and accessed electronically via a computer. The term database or repository may thus refer to a storage device comprising a database. The mass storage device 610 may comprise one or more of a solid state drive, hard disk drive, a magnetic disk drive, an optical disk drive, or the like. In some embodiments, data, programs, or other information may be stored remotely, for example in the cloud. Computerized system 600 may send or receive information to the remote storage in any suitable way, including via communications subsystem 608 over a network or other data communication medium.

The I/O interface 606 may provide interfaces for enabling wired and/or wireless communications between computerized system 600 and one or more other devices or systems, such as an electric vehicle charging system. Furthermore, additional or fewer interfaces may be utilized. For example, one or more serial interfaces such as Universal Serial Bus (USB) (not shown) may be provided. Further, system 600 may comprise or be communicatively connectable to a display device, and/or speaker device, a microphone device, an input device such as a keyboard, pointer, mouse, touch screen display or any other type of input device.

Computerized system 600 may be used to configure, operate, control, monitor, sense, and/or adjust devices, systems, and/or methods according to the present disclosure.

A communications subsystem 608 may be provided for one or both of transmitting and receiving signals over any form or medium of digital data communication, including a communication network. Examples of communication networks include a local area network (LAN), a wide area network (WAN), telecommunications network, cellular network, an inter-network such as the Internet, and peer-to-peer networks such as ad hoc peer-to-peer networks. Communications subsystem 608 may include any component or collection of components for enabling communications over one or more wired and wireless interfaces. These interfaces may include but are not limited to USB, Ethernet (e.g. IEEE 802.3), high-definition multimedia interface (HDMI), Firewire™ (e.g. IEEE 1374), Thunderbolt™, WiFi™ (e.g. IEEE 802.11), WiMAX (e.g. IEEE 802.16), Bluetooth™, or Near-field communications (NFC), as well as General Packet Radio Service (GPRS), Universal Mobile Telecommunications System (UMTS), Long-Term Evolution (LTE), LTE-A, 5G NR (New Radio), satellite communication protocols, and dedicated short range communication (DSRC). Communication subsystem 608 may include one or more ports or other components (not shown) for one or more wired connections. Additionally or alternatively, communication subsystem 608 may include one or more transmitters, receivers, and/or antenna. Further, computerized system 600 may comprise clients and servers (none of which are shown).

Logical operations of the various embodiments according to the present disclosure may be implemented as (i) a sequence of computer implemented steps, procedures, or operations running on a programmable circuit in a computer, (ii) a sequence of computer implemented operations, procedures, or steps running on a specific-use programmable circuit; and/or (iii) interconnected machine modules or program engines within the programmable circuits. The computerized device or system 600 of FIG. 6 may practice all or part of the recited methods or operations, may be a part of systems according to the present disclosure, and/or may operate according to instructions in computer-readable storage media. Such logical operations may be implemented as modules configured to control a computer processor, such as processor 602, to perform particular functions according to the programming of the module. In other words, a computer processor, such as processor 602, may execute the instructions, steps, or operations according to the present disclosure, including of the one or more of the blocks or modules. For example, one or more of the modules or blocks in FIG. 1 may be configured to control processor 602. For example, the modules or blocks in FIG. 1 may include but are not limited to, for example, edge subsystem 160, data processor 162, trained estimator 164, optimizer 120, center subsystem 110, data processor 112, and so on. At least some of these blocks or modules may be stored on storage device 610 and loaded into memory 604 at runtime or may be stored in other computer-readable memory locations.

Computerized system 600 of FIG. 6 is merely an example and is not meant to be limiting. Various embodiments may utilize some or all of the components shown or described. Some embodiments may use other components not shown or described but known to persons skilled in the art.

The concepts of real-time and near real-time may be defined as providing a response or output within a predetermined time interval, usually a relatively short time. A time interval for real-time is generally shorter than an interval for near real-time. Mere non-limiting examples of predetermined time intervals may include the following as well as values below, between, and/or above these figures: 10 s, 60 s, 5 min, 10 min, 20 min, 30 min, 60 min, 2 hr, 4 hr, 6 hr, 8 hr, 10 hr, 12 hr, 1 day.

The term module used herein may refer to a software module, a hardware module, or a module comprising both software and hardware. Generally, software includes computer executable instructions, and possibly also data, and hardware refers to physical computer hardware.

Embodiments and operations according to the present disclosure may be implemented in digital electronic circuitry, and/or in computer software, firmware, and/or hardware, including structures according to this disclosure and their structural equivalents. Embodiments and operations according to the present disclosure may be implemented as one or more computer programs, for example one or more modules of computer program instructions, stored on or in computer storage media for execution by, or to control the operation of, one or more computer processing devices such as a processor. Operations according to the present disclosure may be implemented as operations performed by one or more processing devices on data stored on one or more computer-readable storage devices or media, and/or received from other sources.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not necessarily provided as to whether the embodiments described herein are implemented as a computer software, computer hardware, electronic hardware, or a combination thereof.

In at least some embodiments, one or more aspects or components may be implemented by one or more special-purpose computing devices. The special-purpose computing devices may be any suitable type of computing device, including desktop computers, portable computers, handheld computing devices, networking devices, or any other computing device that comprises hardwired and/or program logic to implement operations and features according to the present disclosure.

Embodiments of the disclosure may be represented as a computer program product stored in a machine-readable medium (also referred to as a computer-readable medium, a processor-readable medium, or a computer usable medium having a computer-readable program code embodied therein). The machine-readable medium may be any suitable tangible, non-transitory medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

The term 'data' generally refers to raw or unorganized facts whereas 'information' generally refers to processed or organized data. However, the terms are generally used synonymously herein unless indicated otherwise.

In addition, the steps and the ordering of the steps of methods and data flows described and/or illustrated herein are not meant to be limiting. Methods and data flows comprising different steps, different number of steps, and/or different ordering of steps are also contemplated. Furthermore, although some steps are shown as being performed consecutively or concurrently, in other embodiments these steps may be performed concurrently or consecutively, respectively.

For simplicity and clarity of illustration, reference numerals may have been repeated among the figures to indicate corresponding or analogous elements. Numerous details have been set forth to provide an understanding of the embodiments described herein. The embodiments may be practiced without these details. In other instances, well-known methods, procedures, and components have not been described in detail to avoid obscuring the embodiments described.

The embodiments according to the present disclosure are intended to be examples only. Alterations, modifications and variations may be effected to the particular embodiments by those of skill in the art without departing from the scope, which is defined solely by the claims appended hereto.

The terms "a" or "an" are generally used to mean one or more than one. Furthermore, the term "or" is used in a non-exclusive manner, meaning that "A or B" includes "A but not B," "B but not A," and "both A and B" unless otherwise indicated. In addition, the terms "first," "second," and "third," and so on, are used only as labels for descriptive purposes, and are not intended to impose numerical requirements or any specific ordering on their objects.

The invention claimed is:

1. A method comprising:
at one or more electronic devices each having one or more processors and memory:
receiving state of charge (SoC) information relating to a battery of an electric vehicle (EV), the SoC information associated with a first time;
receiving exogenous information associated with the EV, wherein the exogenous information consists of information that is exogenous to the battery of the EV, and wherein at least some of the exogenous information corresponds to when the EV is in an operational state;
estimating, using a machine learning based estimator SoC information of the battery of the EV while the EV is in an operational state based on the received SoC information and the exogenous information, the estimated SoC information associated with a second time that is later than the first time;

providing the estimated SoC information to a vehicle fleet control optimization system; and controlling a fleet of one or more EVs using the vehicle fleet control optimization system, the controlling including the one or more processors generating EV charging scheduling information based on the estimated SoC information, and the controlling further including controlling charging of at least one EV based on the EV charging scheduling information.

2. The method of claim 1, wherein the exogenous information comprises weather data relating to weather conditions and/or weather forecast information in a geographical area in which the EV is operating.

3. The method of claim 1, wherein the exogenous information comprises geo data relating to traffic conditions in a geographical area in which the EV is operating.

4. The method of claim 1, wherein the exogenous information comprises driver behavior data associated with operation of the EV by the driver relating to rate of vehicle acceleration and/or vehicle speed.

5. The method of claim 1, wherein the at least some of the exogenous information received while the EV is in an operational state comprises live data.

6. The method of claim 1, further comprising:

training the machine learning based estimator using supervised learning and using historical exogenous information associated with a plurality of EVs.

7. The method of claim 1, wherein the controlling charging comprises the one or more processors generating control actions and initiating communication of the control actions to one or more controllable assets for controlling charging of the at least some of the EVs.

8. A system, comprising:

one or more processors; and memory storing instructions for execution by the one or more processors, the instructions for operations comprising:

receiving state of charge (SoC) information relating to a battery of an electric vehicle (EV), the SoC information associated with a first time;

receiving exogenous information associated with the EV, wherein the exogenous information consists of information that is exogenous to the battery of the EV, and wherein at least some of the exogenous information corresponds to when the EV is in an operational state;

estimating, using a machine learning based estimator, SoC information of the battery of the EV while the EV is in an operational state based on the received SoC information and the exogenous information, the estimated SoC information associated with a second time that is later than the first time;

providing the estimated SoC information to a vehicle fleet control optimization system; and controlling a fleet of one or more EVs using the vehicle fleet control optimization system, the controlling including the one or more processors generating EV charging scheduling information based on the estimated SoC information, and the controlling further including controlling charging of at least one EV based on the EV charging scheduling information.

9. The system of claim 8, wherein the exogenous information comprises weather data relating to weather conditions and/or weather forecast information in a geographical area in which the EV is operating.

10. The system of claim 8, wherein the exogenous information comprises geo data relating to traffic conditions in a geographical area in which the EV is operating.

11. The system of claim 8, wherein the exogenous information comprises driver behavior data associated with operation of the EV by the driver relating to rate of vehicle acceleration and/or vehicle speed.

12. The system of claim 8, wherein the at least some of the exogenous information received while the EV is in an operational state comprises live data.

13. The system of claim 8, the instructions for operations further comprising:

training the machine learning based estimator using supervised learning and using historical exogenous information associated with a plurality of EVs.

14. The system of claim 8, wherein the controlling charging comprises the one or more processors generating control actions and initiating communication of the control actions to one or more controllable assets for controlling charging of the at least some of the EVs.

15. A non-transitory computer-readable medium having computer-readable instructions stored thereon, the computer-readable instructions executable by at least one processor to cause the performance of operations comprising:

receiving state of charge (SoC) information relating to a battery of an electric vehicle (EV), the SoC information associated with a first time;

receiving exogenous information associated with the EV, wherein the exogenous information consists of information that is exogenous to the battery of the EV, and wherein at least some of the exogenous information corresponds to when the EV is in an operational state;

estimating, using a machine learning based estimator, SoC information of the battery of the EV while the EV is in an operational state based on the received SoC information and the exogenous information, the estimated SoC information associated with a second time that is later than the first time;

providing the estimated SoC information to a vehicle fleet control optimization system; and controlling a fleet of one or more EVs using the vehicle fleet control optimization system, the controlling including the one or more processors generating EV charging scheduling information based on the estimated SoC information, and the controlling further including controlling charging of at least one EV based on the EV charging scheduling information.

16. The non-transitory computer-readable medium of claim 15, wherein the exogenous information comprises weather data relating to weather conditions and/or weather forecast information in a geographical area in which the EV is operating.

17. The non-transitory computer-readable medium of claim 15, wherein the exogenous information comprises geo data relating to traffic conditions in a geographical area in which the EV is operating.

18. The non-transitory computer-readable medium of claim 15, wherein the exogenous information comprises driver behavior data associated with operation of the EV by the driver relating to rate of vehicle acceleration and/or vehicle speed.

19. The non-transitory computer-readable medium of claim 15, the computer-readable instructions for operations further comprising:

training the machine learning based estimator using supervised learning and using historical exogenous information associated with a plurality of EVs.

20. The non-transitory computer-readable medium of claim 15, wherein the controlling charging comprises the one or more processors generating control actions and initiating communication of the control actions to one or more controllable assets for controlling charging of the at least some of the EVs.

* * * * *